(12) United States Patent
Crabtree et al.

(10) Patent No.: US 6,236,736 B1
(45) Date of Patent: *May 22, 2001

(54) METHOD AND APPARATUS FOR DETECTING MOVEMENT PATTERNS AT A SELF-SERVICE CHECKOUT TERMINAL

(75) Inventors: Ralph N. Crabtree, Atlanta; Jianzhong Huang, Snellville; Junhoy Kim, Tucker, all of GA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,322

(22) Filed: Feb. 6, 1998

Related U.S. Application Data

(60) Provisional application No. 60/050,972, filed on Jun. 19, 1997, provisional application No. 60/045,001, filed on Feb. 7, 1997, and provisional application No. 60/037,728, filed on Feb. 7, 1997.

(51) Int. Cl.[7] ..................................................... G06K 9/00
(52) U.S. Cl. ........................................... 382/103; 235/383
(58) Field of Search ................................... 382/103, 104, 382/107, 115, 100; 235/383; 348/135, 155, 157; 186/61

(56) References Cited

U.S. PATENT DOCUMENTS

| | | | | |
|---|---|---|---|---|
| 5,115,888 | * | 5/1992 | Schneider | 235/383 |
| 5,426,282 | * | 6/1995 | Humble | 235/383 |
| 5,494,136 | * | 2/1996 | Humble | 235/383 |
| 5,594,469 | * | 1/1997 | Freeman et al. | 345/158 |
| 5,801,766 | * | 9/1998 | Alden | 348/157 |
| 5,883,968 | * | 3/1999 | Welch et al. | 382/100 |
| 6,002,808 | * | 12/1999 | Freeman | 382/288 |

OTHER PUBLICATIONS

Ko et al. "Extracting the hand region with the aid of a tracking facility" Electronics Letters vol. 32 pp. 1561–1563, Aug. 1996.*

Ayer et al. "Layered representation of motion video using robust maximum–likelihood estimation of mixture models and MDL encoding" IEEE Proc. of 5th International Conference on Computer Vision pp. 777–784, Jun. 1995.*

Sawasaki et al. "Design and implementation of high speed visual tracking system for real time motion analysis" Proc. of teh 13th International Conf. on Pattern Recognition, vol. 3, pp. 478–483, Aug. 1996.*

"Deformable Contours: Modeling, Extraction, Detection and Classification" by Kok Fung Lai, 1994.

"Vision Tutor" Version 1.1 Lecture Guide Ch. 5–6, from Amerinex Artificial Intelligence, Inc. 1995, pp. 5–1–6–90.

(List continued on next page.)

Primary Examiner—Amelia M. Au
Assistant Examiner—Jingge Wu
(74) Attorney, Agent, or Firm—Needle & Rosenberg, P.C.

(57) ABSTRACT

A system and method for detecting hand and item movement patterns comprising a video camera positioned to view a scene which includes therein a scanner for scanning items, wherein the video camera generates a sequence of video frames representing activity in the scene, processing means coupled to the video camera, the processing means performing steps of identifying regions of a video frame representing a hand; and tracking hand movement with respect to the scanner over a plurality of video frames. Event information descriptive of user activity at the self-service checkout terminal is generated based on the tracking information.

21 Claims, 5 Drawing Sheets

U.S. PATENT DOCUMENTS

"Reduction of color space dimensionality by moment–preserving thresholding and its application for edge detection in color images" by Chen–Kuei Yang et al., in Pattern Recognition Letters, 1996, pp. 481–490.

"Automatic Feature Point Extraction and Tracking in Image Sequences for Unknown Camera Motion" by Qinfen Zheng and Rama Chellappa, IEEE Proc. 4th International Conference on Computer Vision, 1993, pp. 335–339.

"Object Tracking Using Curvilinear Features" by J.G. Landowski and R.S. Loe, SPIE vol. 974 Applications of Digital Image Processing XI (1988), pp. 353–360.

"Detection and Tracking of Facial Features by Using Edge Pixel Counting and Deformable Circular Template Matching" by De Silva, Aizawa and Hatori, IEICE Trans. Inf. & Syst. vol. E78–D, No. 9, Sep. 1995, pp. 1195–1207.

"Moving Object Tracking Using Local Windows" by Celenk and Reza, IEEE International Symposium on Intelligent Control 1988, pp. 180–185.

"Estimating Three–Dimenstional Motion Parameters of a Rigid Planar Patch" by Tsai and Huang, IEEE Pattern Recognition and Image Processing, 1981, pp. 94–118.

"Tracking Human Movements Using Finite Element Methods" by Wen–hung Liao, May 20, 1994.

"Object Tracking Through Adaptive Correlation" by Montera, Rogers, Ruck and Oxley, SPIE vol. 1959 Optical Pattern Recognition IV (!993), pp. 314–320.

"Object Tracking Through Adaptive Correlation" by Montera, Rogers, Ruck and Oxley, vo. 33, No. 1, Optical Engineering, Jan. 1994, pp. 294–302.

"Tracking Multiple Features Using Relaxation" by Jim Z.C. Lai, Pattern Recognition, vol. 26, No. 12, pp. 1827–1837, 1993.

"3D Structure and Motion Estimation from 2D Image Sequences" by Tan, Baker and Sullivan, Image and Vision Computing, vol. 11, No. 4, May 1993, pp. 203–210.

"Object Tracking With a Moving Camera" by Burt, Bergen, Hingorani et al., Workshop on Visual Motion, 1989.

"A Semi–Automated Film/Video System for Motion Tracking" by Kohler, Glazer and Williams, SPIE vol. 1823, SPIE Machine Vision Applications, Architectures and Systems Integration, pp. 316–321.

"Segmentation of People in Motion" by Shio and Sklansky in IEEE Workshop on Visual Motion, 1991, pp. 325–332.

"Towards Model–Based Recognition of Human Movements in Image Sequences" by Rohr, Image Understanding, vol. 59, No. 1, Jan., 1994, pp. 94–115.

"Finding Trajectories of Feature Points in a Monocular Image Sequence" by Sethi and Jain, Transactions of Pattern Analysis and Machine Intelligence, vol. PAMI–9, No. 1, Jan. 1987, pp. 56–73.

"Feature Point Correspondence in the Presence of Occlusion" by Salari and Sethi, Transactions on Pattern Analysis and Machine Intelligence, vol. 12, No. 1, Jan. 1990, pp. 87–91.

"Camera Geometries for Image Matching in 3D Machine Vision" by Alvertos, Brzakovic and Gonzalez, Transactions on Pattern Analysis and Machine Intelligence, vol. II, No. 9, Sep. 1989, pp. 897–915.

"An Efficient and Accurate Camera Calibration Technique for 3D Machine Vision" by Tsai, IEEE Computer Vision and Pattern Recognition, 1986, pp. 364–374.

"Multiple Perspective Interactive Video" by Jain and Wakimoto, IEEE, 1995, pp. 202–211.

"Immersive Video" by Moezzi, Katkere and Jain, SPIE, vol. 2656, 1996, pp. 332–343.

"Uniqueness and Estimation of Three–Dimensional Motion Parameters of Rigid Objects with Curved Surfaces" by tsai and Huang, IEEE Pattern Recognition and Image Processing, 1982, pp. 112–118.

* cited by examiner

METHOD AND APPARATUS FOR DETECTING MOVEMENT PATTERNS AT A SELF-SERVICE CHECKOUT TERMINAL

This application claims the benefit of U.S. Provisional Application No. 60/037,728, filed Feb. 7, 1997, U.S. Provisional Application No. 60/045,001, filed Feb. 7, 1997, and U.S. Provisional Application No. 60/050,972, filed Jun. 19, 1997.

CROSS REFERENCE TO RELATED APPLICATIONS

Cross reference is made to the following commonly assigned U.S. patent applications.

1. U.S. patent application Ser. No. 09/019,880 Entitled "Method And Application For Enhancing Security In A Self-Service Checkout Terminal" filed on even date, the entirety of which is incorporated herein by reference.
2. U.S. patent application Ser. No. 09/020,333 entitled "System And Method For Tracking Movement of Objects In a Scene", filed on even date, the entirety of which is incorporated herein by reference.
3. U.S. patent application Ser. No. 09/009,167, filed Jan. 20, 1998, entitled "System And Method for Multi-Resolution Background Adaptation", the entirety of which is incorporated herein by reference.
4. U.S. patent application Ser. No. 08/996,211, filed Dec. 24, 1997, entitled "System and Method For Segmenting Image Regions From A Scene Likely To Represent Particular Objects In The Scene", the entirety of which is incorporated herein by reference.

BACKGROUND OF THE INVENTION

1. Field of the Invention

The present invention relates to a point-of-sale system for retail environments, and more particularly to a system and method for detecting and analyzing motion patterns of individuals at a self-service checkout point-of-sale.

2. Description of the Prior Art

In the retail industry, labor is the number one expense after cost of goods sold. Employees working as "checkout personnel" or "cashiers" are the single largest category of labor. This is particularly true for those retailers in the food segment. On average, the retailer must have three or more cashiers trained for every checkout lane in a food store.

One problem for retailers is the cost associated with the recruiting, hiring, training, scheduling, managing, etc. of cashiers. This cost is exacerbated in that turnover in the food segment can easily exceed 100% annually, especially in metropolitan areas. It is not uncommon for food retailers to have significantly fewer cashiers on hand in a retail establishment than is optimally required.

The constant recruiting, hiring, training, and scheduling of cashiers consumers significant management time and expense. Scheduling alone can make or break a retailer's performance on any given day and significantly impact customer service. By scheduling too many cashiers, the retailer has excess capacity and a higher cost of sales for the day. By scheduling too few cashiers, checkout queues grow long with angry customers who may not return due to poor customer service. Other customers may enter the store and go elsewhere due to the long lines. Checkout problems are typically the leading consumer dissatisfaction issue for retailers.

Self Checkout (SCO) Terminals offer benefits to both the retailer and the consumer. For the retailer, SCO terminals reduce the retailer's need for cashiers, thereby reducing the costs associated with them. Since SCO terminals are rarely closed, the job of predicting and scheduling cashier demand is made easier. For the consumer, SCO terminals offer the perception of faster checkout, privacy, control, etc., and a significantly enhanced shopping experience.

Thus, in theory, replacing traditional cashier assisted checkout with self checkout makes great business sense. However, the cashier performs several roles for the retailer in addition to itemizing and tendering groceries. One significant role is that of security—ensuring that the consumers pay for all the groceries that they take out of the store. A SCO terminal can enable the consumer to take the cashier's place in itemizing and tendering. But the concern remains how to ensure that the consumer pays for all the items taken out of the store.

Loss prevention specialists know that the probability of theft increases when someone believes an opportunity exists to deceive without an offsetting risk of detection/consequence. By removing the cashier, the consumer is no longer faced with a significant method of detection.

Typical SCO solutions have used technologies that are not consumer friendly, are perceived as non-trusting, fail to support the consumer throughout the transaction, and have placed added operational issues on the retailer.

There is therefore a significant need in the art for a system and method for providing security for self checkout environments in a way that is effective and efficient, but is also acceptable to the consumer.

SUMMARY OF INVENTION

The present invention operates to process a sequence of input images received from one or more cameras monitoring a self-checked checkout workstation in, for example, a retail environment. In a preferred embodiment, the present invention may operate to collect data that may be useful in analyzing user interaction with a self-checkout workstation or terminal.

The present invention is directed to a system and method for detecting hand movement patterns with respect to a checkout terminal, such as a self-service check-out terminal, by monitoring the scene of the self-service checkout terminal and generating a sequence of video frames representing activity in the scene. The image information in the video frames is processed by a processor, such as a computer to identify regions of a video frame representing a hand; track hand movement with respect to the scanner over a plurality of video frames and generating tracking information representative thereof; and generate event information descriptive of user activity at the self-service checkout terminal based on the tracking information.

The present invention may generate output after performing the above steps. By combining the results of the above steps with the various zones defined in the image, the present invention may generate a series of event records (stored in a file) corresponding to actions taking place at the self check out terminal. For example, an event record may correspond to an empty hand passing over the scanner (including its direction of movement), a product passing over the scanner (including its direction of movement), etc.

The above and other objects and advantages of the present invention will become more readily apparent when reference is made to the following description, taken in conjunction with the following drawings.

DETAILED DESCRIPTION OF THE INVENTION

Figure 1:
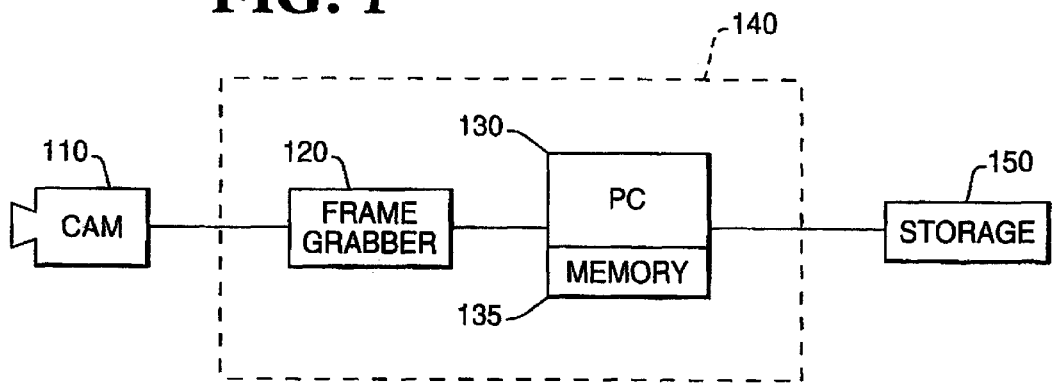
FIG. 1 is a block diagram of the hardware components of the video image processing system of the present invention therein.

A preferred embodiment of the invention is now described in detail. Referring to the drawings, like numbers indicate like components and/or steps throughout the views.

The present invention is directed to a video image processing system and method that serve as a component to self-service checkout system, such as that disclosed in the aforementioned commonly assigned application, entitled "Method of Enhancing Security in a Self-Service Checkout Terminal". The video image processing system detects and tracks the movement of a hand and items in a hand of an individual using a self-service checkout terminal. The tracking information is useful to monitor an individual's use of the self-service checkout terminal in order to detect potential fraudulent activities, i.e., moving an item so as not to be scanned by a scanner for purchase.

FIG. 1 illustrates the hardware components of the video image processing system according to the present invention. The hardware components are standard off-the-shelf components, and include one or more video cameras 110, one or more frame grabbers 120, and a processor 130, such as a personal computer (PC), having a memory 135 which stores software programs for controlling the processor 130. The combination of the video camera 110 and frame grabber 120 may collectively be referred to as an "image acquisition module" 140. The frame grabber 120 receives a standard video signal output by the video camera 110, such as a RS-170, NTSC, CCIR, or PAL video signal, which can be monochrome or color. In a preferred embodiment, the video camera(s) 110 are mounted or positioned to view a selected viewing area or scene 150 of interest, such as a self-checkout lane in a retail establishment.

The frame grabber 120 is embodied, for example, by a Meteor™ Color Frame Grabber, available from Matrox. The frame grabber 120 operates to convert the analog video signal into a sequence or stream of digital video frame images that are stored within the memory 135, and processed by the processor 130. For example, in one implementation, the frame grabber 120 converts the video signal into a 2×2 sub-sampled NTSC image which is 320× 240 pixels or a 2×2 sub-sampled PAL color image which is 384×288 pixels, or in general a W×L image defining a single video frame of video information. A variety of other digital image formats and resolutions are also suitable, as will be recognized by of ordinary skill in the art. Each pixel of a video frame has a predetermined bit resolution, such as 8 bits, and color data may be used to increase system performance. The digital information representing each video frame is stored in the memory 135 asynchronously and in parallel with the various processing functions described below.

As representation of the stream of digital images from the camera(s) 110 are sequentially stored in memory 135, analysis of the video image may begin. All analysis according to the teachings of the present invention may be performed by the PC 130, but may also be performed by any other suitable means. Such analysis is described in further detail below.

Figure 2:
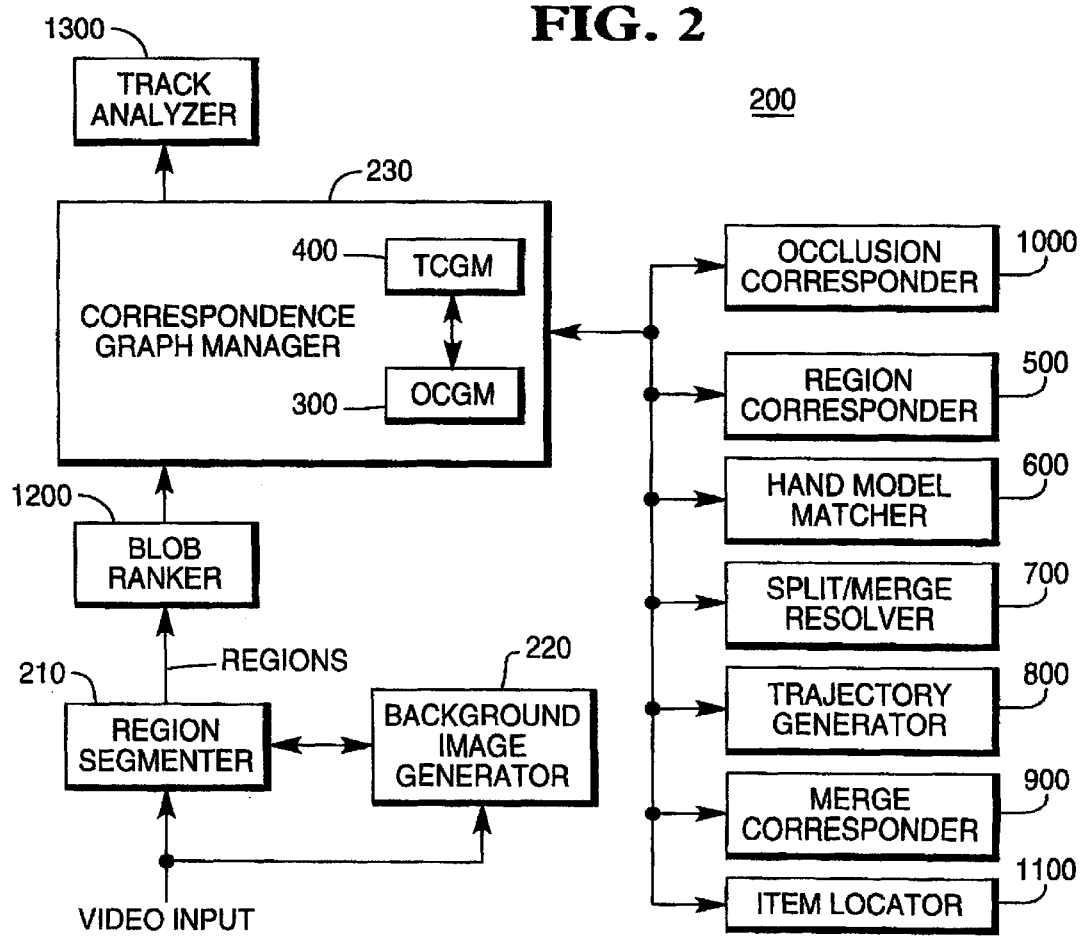
FIG. 2 is a block diagram of a flow chart illustrating the architecture of a tracking system used to track hands and items according to the present invention.

Turning to FIG. 2, an architectural flow chart of a video image processing system (also called the "tracking system") is shown. The tracking system is more fully disclosed in commonly assigned application entitled "System And Method For Tracking Movement Of Objects In A Scene", which is incorporated herein by reference.

The tracking system is represented by reference numeral 200. Each block in FIG. 2 represents a function performed by a software program or module stored in the memory 135 and executed by the processor 130. The processor 130 is part of an industry standard personal computer (PC) using a standard operating system, such as Windows NT®.

The individual functions of the tracking system are preferably implemented by way of a software program that may be installed in the memory 135 from another memory/ storage medium, such as a CD-ROM, floppy disk(s), hard disk, etc., or it may be downloaded from an internet site, or from an on-line service for installation into the memory 135. The tracking system is implemented by several software programs or modules, each comprising a plurality of executable instructions which, when stored in the memory 135, cause the processor 130 to perform the processes shown and described hereinafter. However, one with ordinary skill in the art will appreciate that the region segmentation functionality could be implemented by one or more application specific integrated circuits, a digital signal processor or other suitable signal processing architectures.

The tracking system 200 comprises a region segmenter 210 and a background image generator 220. Each receives as input video frames representing activity within the scene. The region segmenter 210 extracts regions from the video frames that likely correspond to objects to be tracked or identified in the scene. The regions are extracted with reference to a background image that is generated by the background image generator 220.

There are many ways to generate a background image. A method and system developed by the assignee of the present application is disclosed in U.S. patent application Ser. No. 09/009,167, filed Jan. 20, 1998, entitled "System and Method for Multi-Resolution Background Adaptation". Similarly, a method and system for performing region segmentation developed by the assignee of the present invention is disclosed in U.S. patent application Ser. No. 08/998, 211, filed Dec. 24, 1997, entitled "System and Method for Segmenting Image Regions From a Scene Likely to Represent Particular Objects in the Scene". The entirety of these applications are incorporated herein by reference.

The correspondence graph manager (CGM) 230 comprises an object correspondence graph manager (OCGM) 300 and a track correspondence graph manager (TCGM) 400. The OCGM 300 forms a first correspondence graph, called an object correspondence graph (OCG). The OCG comprises a plurality of nodes representing region clusters and a plurality of tracks each comprising an ordered set of nodes in consecutive video frames that represents a possible path of a particular region cluster, that is, an object, through the scene. The OCG is a graph of object tracks over a relatively short period of time, such as 8 to 10 video frames. The OCGM 300 calls upon the function of several other modules, including a region corresponder 500, a hand model matcher 600, a split/merger resolver 700, a trajectory generator 800, a merge corresponder 900, and an item locator 1100. The TCGM 400 calls upon the functions of an occlusion corresponder 1000 and based on the information generated by the OCGM 300, generator a second correspondence graph, called a track correspondence graph (TCG) that contains a list of OCG tracks over longer periods of time. The TCG is a list of tree data structures that represent track information for objects. Each node in the tree refers to one or more OCG tracks, and represents some portion of an object track through the scene.

The image segmenter module 210 performs image segmentation on the input image, producing a set of regions or "blobs" (connected components). A blob refers to part or all of some object in the image scene stored in memory 135 that is not contained in the background.

Next, the blob ranker 1200 orders the set of blobs (regions) based on the likelihood that a blob contains a hand of a person. The CGM 230, through the OCGM 300, resegments the blob based on color attributes and creates region clusters that are evaluated by the hand model matcher module 600 in order to search and select region clusters having a high likelihood of being a hand. If a hand is located, information regarding the location and other features about the hand are passed to the item locator module 1100. The item locator module 1110 then attempts to locate an item in the hand.

After locating hands and items, the OCGM 300 attempts to match these objects with objects identified in previous frames. By linking objects to previous frame objects, the path of products and hands through the region of interest in constructed. Tracks of objects over several frames are constructed by the TCGM 400. Finally, the track analyzer module 1300 takes the output of the TCGM 400 and provides a real-world interpretation of the activities occurring within the video image.

Figure 3:
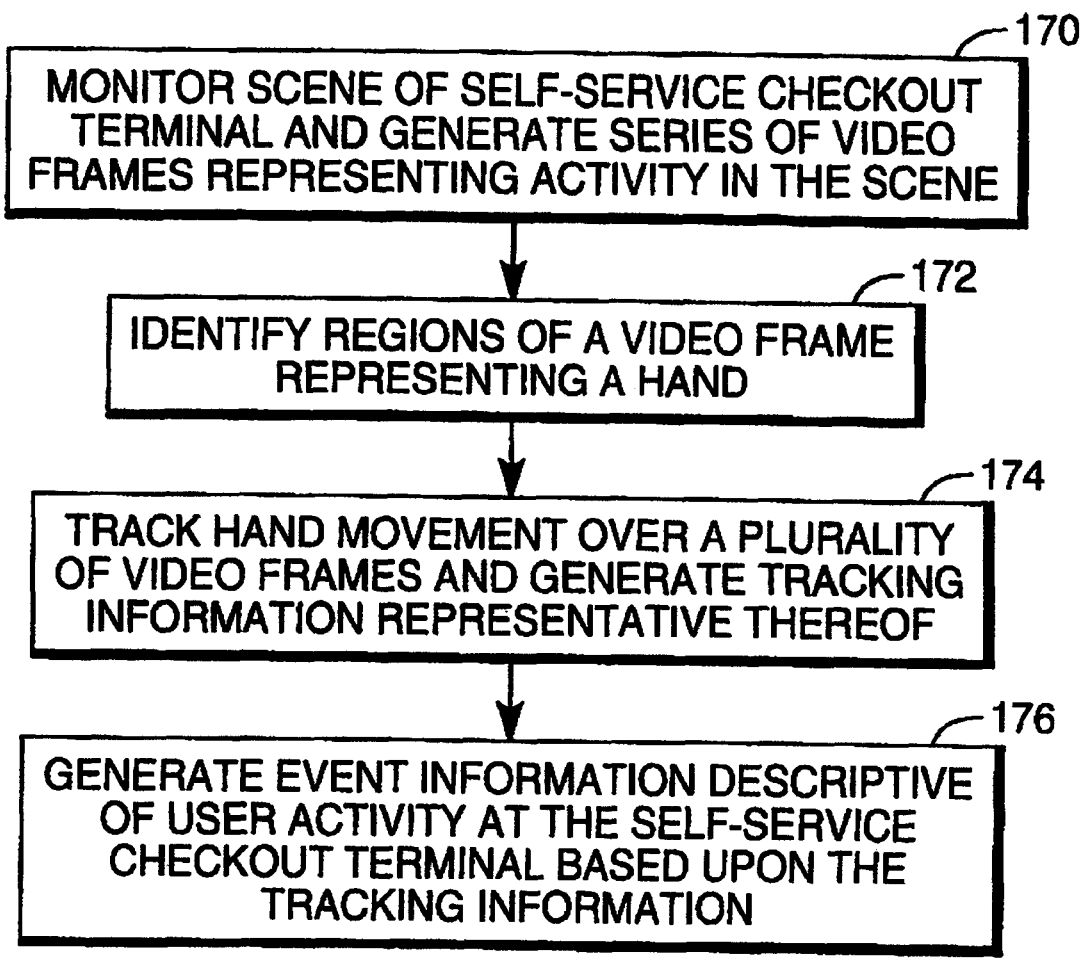
FIG. 3 is a general flow chart depicting the general operation of the system and method according to the present invention.

FIG. 3 illustrates the overall flow process of the system and method according to the present invention. In step 170, the scene of a self-service checkout terminal with the video camera and a series of video frames representing activity in the scene are generated. In step 172, image regions (blobs) of a video frame representing a hand are identified. In step 174, hand movements are tracked with respect to the scanner over a plurality of video frames and tracking information representative thereof is generated Finally, in step 176, event information descriptive of user activity at the self-service checkout terminal based on the tracking information is generated. This event information may be in the form of digital signals which are output to a security monitoring component of a self-service checkout terminal.

Figure 4:
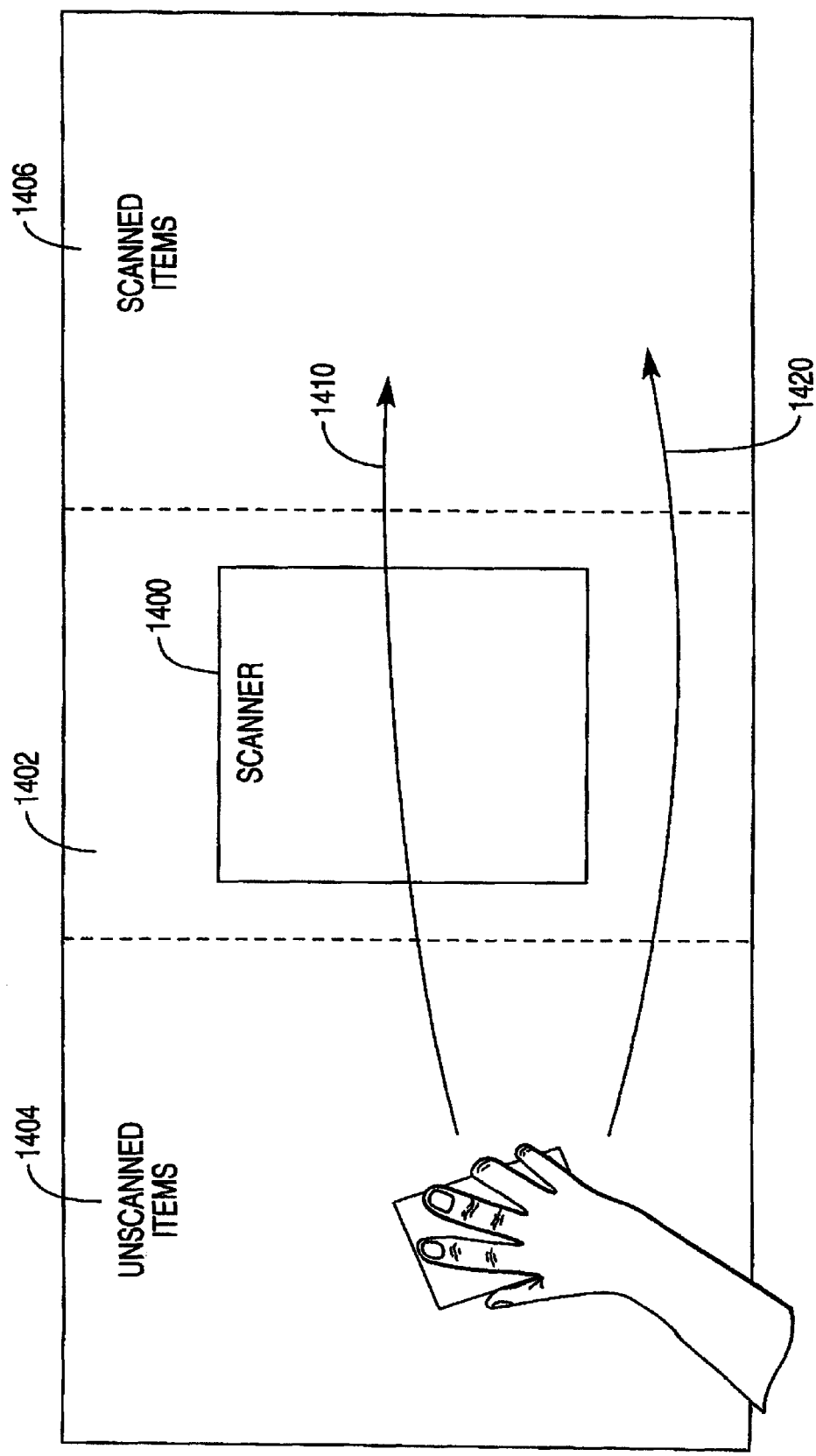
FIG. 4 is a diagram depicting how hands and/or items are tracked across a zone containing a scanner.

More specifically, with reference to FIG. 4, the tracking system 200 detects and tracks the movement of an item (product) that should be scanned for purchase, lease, etc., in the hand of an individual to verify whether it passes over a scanner 1400. Thus, the video camera 110 views a scene consisting of the scanner 1400 in a scanner zone 1402 to detect a hand of an individual and an item in the individual's hand, and to track the hand and item moving over the scanner. In essence, the tracking system 200 detects and tracks the movement of a hand and/or item from a zone 1404 containing unscanned items, through the scanner zone 1402, and into a zone 1406 containing scanning items (called scanned product zone or scanned item zone). The scanned product zone may be an area referred to as a "bagging area", where supposedly purchased items are placed to be bagged for transport. The path of movement of an item or hand/item combination is tracked in this manner, with the purpose of determining when a track passes over a sufficient portion of the scanner 1400 in the scanner zone 1402. A track which passes through the scanner zone 1402 is shown at reference numeral 1410. A track which does not pass through a sufficient portion of the scanner zone 1402 is shown at reference numeral 1420. The security component portion of the self-service checkout system detects fraudulent activity based on track information and other inputs, such as scanner events, in order to trigger alarm signals.

The scanner 1400 is an optical barcode scanner, for example. Alternatively, it may be any type of item or product scanner (optical, electromagnetic, magnetic, etc.) heretofore known, or developed hereinafter. The scanner 1400 may include an integrated scale so that items placed on the scanner can be scanned and/or weighed.

The following is a more detailed description of those components of the tracking system 200 referred to above, that are different from the system described in the aforementioned application.

Blob Ranker Module 1200

The function of the blob ranker module 1200 is to identify and rank the blobs (regions) that are most likely to contain a hand and/or product. Each blob is assigned a confidence value that corresponds to the likelihood. Blob ranking is performed so that the search space is reduced for the hand model matcher 600 and item locator module 1100 (described in more detail hereinafter), allowing those modules to use a more sophisticated search method on a smaller set of blobs. Since the self-service checkout terminal camera 110 view may be fixed, a number of simple constraints can be applied to generate a confidence value. For example, such constraints may include:

1. Moving blobs. A human hand or product is most likely to be contained in a moving blob. For customer activity to occur at the self-service checkout terminal, motion must occur.

2. Color information. It has been shown that the skin color of a human hand has a unique color distribution if the proper color system is selected. In the <Y,U,V> color system a normalized color representation, <U*,V*> is employed, where U*=U/Y and V*=V/Y. The reason for normalizing U and V by the Y component is to compensate the color values with intensity values, which is represented by Y, in measuring the color of the given pixel. One advantage of using <U*,V*> over <Y,U,V> is that <U*,V*> is much more uniform across different illumination conditions. In the <U*,V*> space, the image under the shadow has quite similar values to the image under normal illumination conditions, (i.e. without shadow). Furthermore, it has been confirmed that the chromaticity of skin color in <U*,V*> is very uniform across different races such as white, black and Asians etc. The model for skin color consists of a set of statistical parameters, specifically the mean and covariance matrix for the normalized color space (U*,V*). This model is generated by calculating the mean and covariance matrix for a set of sample skin pixel values. A pixel is classified as a hand pixel based on the distance of the normalized U*,V* values of the pixel with respect to the model. The method used to generate the distance value is the Mahalonobis distance. The Mahalonobis distance is the multi-dimensional version of normalized distance from the mean by standard deviation in 1D space. If the distance is less than a threshold, the Mahalonobis distance threshold, the pixel is classified as a skin pixel 3. Size. Minimum size constraints are applied to detect hand regions/blobs. Maximum size constraints are not used because the system detects hand blobs that may be holding items which are very large.

The following is the pseudo code for the blob ranker module 1200.

```
for (i = 0; i < number of regions, i ++)
    ablob = region[i]
    movePixelCnt = movingPixels(ablob)
    if (movepixelCnt > minMovePixelCnt)
        moveConfidence = max
    else
        moveConfidence = max*(movePixelCnt/
            minMovepixelCnt)
    end if
    skinPixelCnt = skinPixels(ablob)
    if (skinPixelCnt > minSkinPixelCnt)
        colorConfidence = max
    else
        colorConfidence = max * (skinPixelCnt/
            minSkinpixelCnt)
    end if
    blobSize = size(ablob)
    if (blobSize > minHandSize)
        sizeConfidence = max
    else
        sizeConfidence = max * (blobSize/minHandSize)
    end if
    blobRankConfidence[i] = w1 * moveConfidence + w2 *
        colorConfidence + w3 * sizeConfidence
end for
sort regions by confidence score
```

Function movingPixels calculates the number of pixels in the region that are equal to 1 in the frame difference image. The frame difference is computed on two consecutive images. Function skinPixels returns the number of total skin pixels within a given region. For each pixel in the given region, the Mahalonobis distance is computed given the skin model. If the distance is less than the Mahalonobis distance threshold, the pixel count is incremented. Function size returns the total pixel count within a given region.

As can be seen, a weighted equation is used to rank order the blobs based on the properties of each blob. The weights w1, w2, w3 can be adjusted to increase or decrease the contribution of each property to the overall rank.

The output of the blob ranker 1200 is an ordered list of regions with confidence values, called the blob rank, that represent the likelihood that a region contains a hand in the scene. Those regions which are determined to be highly unlikely to contain a hand are discarded by the system prior to resegmentation of the regions, as explained hereinafter. The ranked regions are input to the OCGM 300.

Object Correspondence Graph Manager (OCGM) 300

Figure 5:
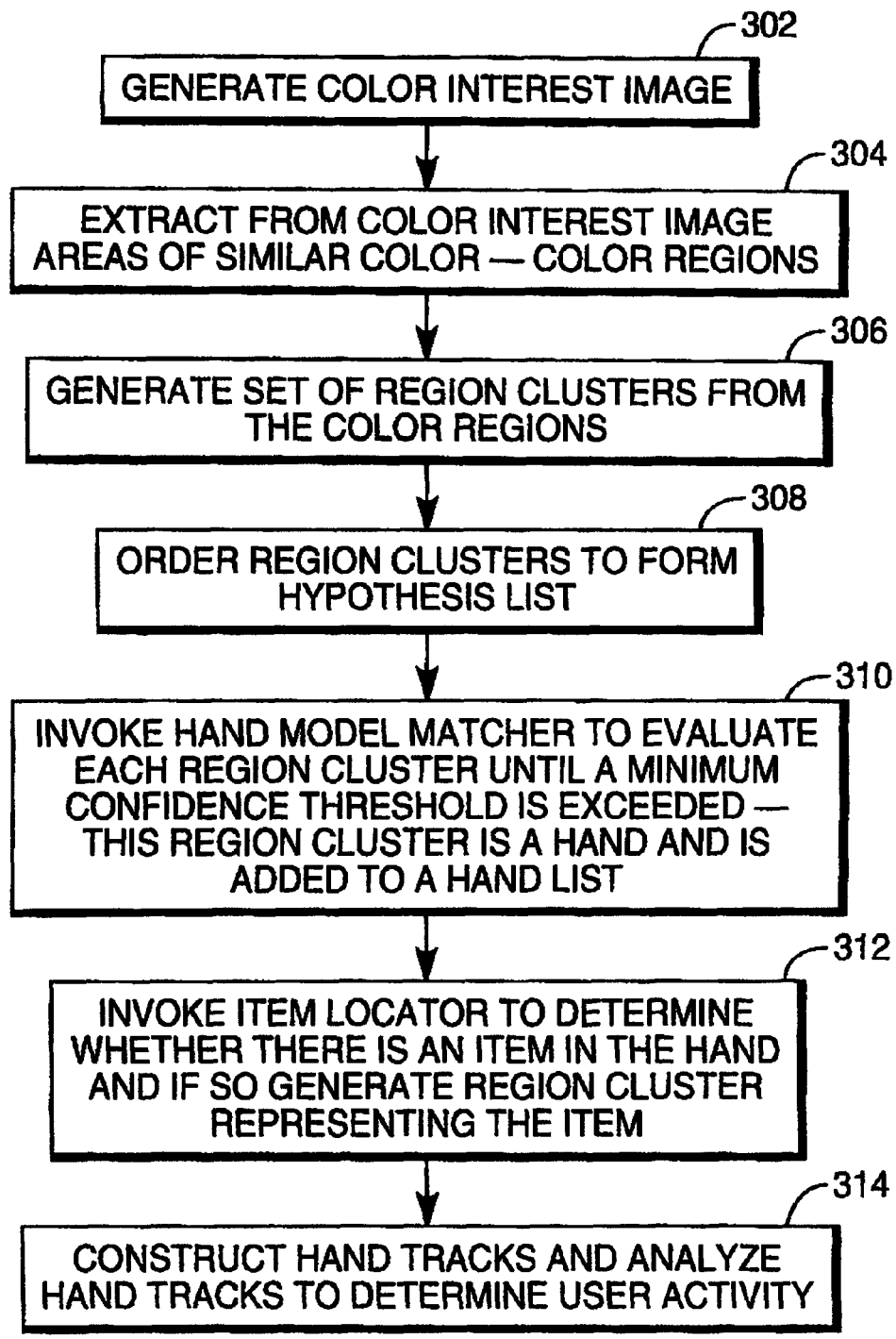
FIG. 5 is a flow chart depicting the various steps involved in tracking movement of a hand according to the present invention.

The OCGM 300 functions as described in the aforementioned related application entitled "System and Method for Tracking Movements of Objects in a Scene", with a few exceptions. With reference to FIG. 5, the operation of the OCGM 300 will be described. Generally, the OCGM 300 operates to generate region clusters, and then to evaluate the region clusters. Input to the OCGM 300 are a list of regions along with their associated blob ranking values. Region clusters are generated from the regions. Initially, a list of regions to be searched for hand objects is constructed. This list consists of all regions that have a blob rank greater than the minimum blob rank threshold. For each region in this list, the following steps are performed.

In step 302, the set of pixels that compose a region are used to mask the Y, U, and V image bands to generate color areas of interest. This yields a color interest image.

In step 304, regions with similar color areas are extracted from the color interest image. These regions are called color regions.

In step 306, a set of hand hypotheses, regions clusters, are generated from the set of color regions by generating combinations of color regions that form region clusters. A set of color regions forms a valid region cluster if the following constraints are met.

(a) Width. The bounding box of the region cluster must be greater than a minimum width and less than a maximum width.

(b) Height. The bounding box of the region cluster must be greater than a minimum height and less than a maximum height.

(c) Total pixels. The total number of pixels comprising the region cluster must be greater than a minimum number of pixels and less than a maximum number of pixels.

(d) Minimum Color Difference. The sum of the difference in the average Y, U, and V value of each region must be less than a minimum color difference threshold when compared to all regions in the region cluster.

Region intersection. Each region in the region cluster must intersect with one or more of the other regions. Region intersection is determined by performing a morphological dilation on the region and then computing the intersection of the region. If the number of pixels in the intersection exceed the minimum intersection threshold, the regions are considered to be a valid combination.

In step 308, the set of region clusters is ordered from largest to smallest, and this ordered set is called the Hypotheses List.

In step 310, each region cluster is evaluated, in order of largest to smallest, by invoking the hand model matcher 600 until a region cluster is reached that has a region cluster confidence value which exceeds the minimum confidence threshold. This region cluster is assumed to be a hand and is added to the list of hands to be tracked, called the Hand List. All remaining region clusters on the Hypotheses List that share area with the identified hand object are deleted from the Hypotheses List. This step is then repeated until the Hypotheses List is empty.

At this point in the process the Hand List contains the set of hand objects to be tracked. Prior to performing the tracking operation, the system attempts to determine if a product is being held by the hand. In step 312, the OCGM 300 performs this operation by invoking the item locator 1100. If an item is found by the item locator 1100, a reference to the item is saved in the respective hand object. In this way, the item is tracked by tracking the hand. At this point in the process, in step 314, the tracking disclosed in the aforementioned related application is invoked, and then the hand tracks generated are analyzed to determine user activity. The tracks are constructed by determining a measure of correspondence between region clusters in consecutive video frames that are determined to represent a hand. This track analysis is described in greater detail in connection with the track analyzer 1300.

If item feature (called feature set) information is required, these features can be extracted by invoking the feature extraction component of the Region Corresponder 500 for that portion of the region cluster that corresponds to an item held by the hand. The feature extraction component of the Region Corresponder 500 is described in more detail in the aforementioned related application.

The system currently assumes that a hand is identified when an item is moving through the camera view. However, in some instances a hand may not be identified. An example of this situation is when a large item is moving through the scene, which may result in the item occluding the hand from the camera view. The system can be easily extended to track the product (as the keying object), since the tracking system is independent of the object type.

Hand Model Matcher Module 600

The hand model matcher (HMM) 600 examines image information for region clusters and determines which region clusters have a high likelihood of being a hand to be tracked. FIG. 3 shows how the hand model matcher 600 interacts with the other components of the tracking system.

The HMM 600 evaluates region clusters based on color, size, shape, position, and other features in order to determine which extracted region clusters have a high likelihood of matching the features of a hand. The HMM 600 generates a confidence value for each region cluster that implicity represents the likelihood of the region cluster corresponding to a hand. The HMM 600 also provides the location in X and Y grid coordinates of the hand, as well as the height and width of the hand. Region clusters, their position and size, and associated confidence value are then inserted into the OCG.

Inputs to the HMM 600 are supplied by the OCGM 300, and are a set of region clusters, i.e. hand candidates, composed of regions output by the region segmenter 210 that have been resegmented, based on color attributes, by the OCGM 300 for the current input image frame, hand model data, and camera calibration data. Output of the HMM are updated confidence values of nodes in the OCG.

The camera calibration data includes the width of the image, in pixels, $I_w$, and the height of the image, in pixels, $I_h$.

The hand model data: includes statistical information (mean and STD) for valid hand and arm lengths; statistical information (mean and STD) for valid hand and arm widths; statistical information (mean and STD) for valid hand and arm area; statistical information (mean and STD) for valid hand shape measures; and statistical information (mean and STD) for valid skin color values (in Y, U, V format).

The HMM 600 performs the several processing steps given this data:
1. Hand features are extracted for each input region cluster, which include area, orientation, the width and height of the oriented bounding box of the region cluster, elongation, compactness, edge density, mean of the normalized color (U/Y, V/Y) of the region cluster, mean and the maximum value of the normalized color (U/Y, V/Y) of the connected components in the region cluster. The following are the definitions of these features:
A. Area:
   Number of pixels within the region cluster.
B. Orientation:
   Orientation is a measure of distribution of region pixels in different directions. The orientation is found by determining the eigen values of the covariance matrix and their corresponding eigen vectors of the region cluster. The covariance matrix is defined as:

$$C = \begin{bmatrix} \mu(2,0) & \mu(1,1) \\ \mu(1,1) & \mu(0,2) \end{bmatrix}$$

Where the momentum functions are defined as:

$$\mu(i,j) = \frac{1}{N} \sum_{x,y} (x-\bar{x})^i (y-\bar{y})^j.$$

Feature $\mu(2,0)$ is a measure of variance of the pixel distribution in the horizontal direction. Similarly, feature $\mu(0,2)$ is a measure of variance of the pixel distribution in the vertical direction. Feature $\mu(1,1)$ represents the covariance of the pixel distribution and contains information about the diagonal distribution of pixels.

The two eigen values $\lambda 1$ and $\lambda 2$ are found by solving the equation $|\lambda I-C|$. Then the two corresponding eigen vectors v1 and v2 can be extracted by solving the equation. The eigen vector corresponding to the larger of the two eigen values is the principal axis of the region, and its angle of orientation is the orientation of the region. The eigen vector corresponding to the smaller of the two eigen values is the secondary axis of the region, which is perpendicular to the principal axis.

C. Width of the oriented bounding box:
   The oriented bounding box is the bounding rectangle of the region cluster. It is aligned with the principal axis of the region, as calculated through the orientation. The oriented bounding rectangle is found by the following steps:
   1. For each row of pixels in the region:
      a Find the endpoints of the row
      b Project the endpoints onto the principal axis.
      c Project the endpoints onto the secondary axis.
   2. Determine the two projected points that are the minimum and maximum values on the principal axis.
   3. Determine the two projected points that are the minimum and maximum values of the secondary axis.
   4. Construct a rectangle by intersecting
      a. a line parallel to the principal axis that passes through the minimum projected value on the secondary axis;
      b. a line parallel to the principal axis that passes through the maximum projected value on the secondary axis;
      c. a line parallel to the secondary axis that passes through the minimum projected value on the principal axis;
      d. a fine parallel to the secondary axis that passes through the maximum projected value on the principal axis.
   This rectangle is the oriented bounding box of the region cluster. The width of the oriented bounding box is the length of its side that is parallel to the secondary axis.
D. Height of the oriented bounding box:
   The height of the oriented bounding box is the length of the side of the bounding box that parallel to the principal axis.

E. Elongation:

Elongation is one of the shape measurements for a given region cluster. It is defined as the following, which is also called the principle axis of inertia.

$$e = \frac{[\mu(0,2) - \mu(0,2)]^2 + 4\mu(1,1)}{\text{Area}}$$

An advantage of this feature is its low computational complexity because it can be determined from pre-computed moments and area values.

F. Compactness:

Compactness is another shape measurement parameters. It is defined as $$\rho = \frac{(\text{perimeter})^2}{4\pi \times \text{Area}}$$

For a round disc-shaped region this parameter takes a value of 1. As the region becomes more non-regular, compactness takes on larger values.

G. Edge Pixel Count:

The total number of edge pixels where their edge value exceeds a given edge threshold. Currently, edge value is calculated as the sum of the absolute values of the luminance difference in the horizontal and vertical directions of its neighborhood. More complex edge detection algorithms can also be used for edge pixel detection.

H. Color features:

Color features are the most important features for hand detection. They include mean normalized color distance, mean normalized color distance of connected components (MeanCCNCD), and max normalized color distance of connected components (MaxCCNCD). The input color image is decomposed into a luminance (Y) and color (U and V) plan. The U and V color components are then normalized by the luminance Y to produce normalized color components U=U/Y and V=V/Y. Meanwhile, the ratio of the normalized color components U and Vis also calculated. These features are then compared with the given skin color model parameters and to form the normalized color distance NCD:

$$NCD = [(U-\bar{U})^2 + (V-\bar{V})^2] \cdot [w + (V|U - \bar{V}|\bar{U})^2],$$

where w is a given weight factor for the normalized color distances. The introduction of the color ratio distance increases the sensitivity of NCD for colors that have different color distribution than the given skin color model parameters. Finally, the mean of NCD for each connected component (MeanCCNCD) within the region cluster is calculated, the maximum of them is the maximum normalized color distance of connected components (MaxCCNCD), the average of them is the mean normalized color distance of connected components (MeanCCNCD), and the average of all the NCD values within the region cluster is the mean normalized color distance (MeanNCD).

2. The hand features described above are compared with the hand model data/parameters, which are the means and standard deviation (STD) of the training hand region clusters. The following non-linear function is used to generate a difference value (diff) for the given feature and hand model parameters:

$$\text{Diff} = \begin{cases} 0, & \text{if } |\text{featureValue} - \text{Mean}| < \text{STD} \\ \left[\dfrac{|\text{featureValue} - \text{Mean}| - \text{STD}}{\text{STD}}\right]^2 & \text{otherwise} \end{cases}$$

The sum of the differences for all of the above features of the region cluster is then calculated and normalized to a value between 0 and 1, and returned. This is used to derive a confidence value.

The outputs of the HMM 600 are a confidence value reflecting the likelihood that the region cluster is a hand; the location in X and Y grid coordinates of the hand object; and the height and width of the hand object.

Item Locator Module 1100

The item locator module 1100 utilizes information from the OCGM 300 to determine if a product/item is moving through the scanner zone.

The inputs to the item locator module 1100 are:
1. A region and the set of color regions, identified in the region by the OCGM 300.
2. The region cluster corresponding to a hand identified in the region by the hand model matcher 600.

The output of the item locator module 1100 is a region cluster, consisting of a set of color regions, that represents the item held in the hand. If an item is not identified, an empty object is returned.

The following assumptions may be used to simplify the implementation of the item locator module 1100.

1. Given a fixed and controlled camera view, users will be standing in front of the scanner bed, i.e. at a bottom part of the image. However, sometimes, she/he can stand to the left or right-side of the scanner. It is physically impossible for the customer to stand at the top-side of the scanner bed.
2. Since the image blob/region corresponding to a user is large and remains outside of the scan/bag area, some of her/his body parts (mainly arm area) will have to touch a point at the image boundary if she/he is in the middle of the item scanning process. This boundary intersection assumption is exploited in the arm blob removal routine defined later in this section.
3. If a hand is identified, then a product moving through the scene must be touching the hand.
4. If a hand is not identified, then the blob moving through the scene is a product. Further, two conditions may exist:
    a) the hand is occluded by the product, or
    b) the product is partially outside of the scanner zone.

If a hand is identified, the problem of locating the product or item in it is constrained to local analysis of the area around the hand. This problem is reduced to a more precise and accurate segmentation of this region, i.e. eliminate the hand and the background and the remaining object is the product. The ability to accurately locate the product item is impacted by the size of the product and the camera view.

A small product, defined as a product approximately the size of the hand or smaller, is difficult to identify with the overhead camera view when the hand occludes the majority of the product. This is a typical case for customers scanning a product in a retail environment, since the hand may be on top of the product with the bar code facing down. However, throughout the path of the scan motion to the bag area, it is likely that at some point the orientation of the hand should allow the system to locate the product. This information must be saved over time, and a voting scheme may be used in order to increase the accuracy of the item locator. This is described in more detail under the heading.

Track Analyzer 1300.

If a hand is not found in the scene, then the moving object is assumed to be the product. Additional segmentation may be performed to eliminate the customer's arm from the product area.

The following is the pseudo code for the hem locator 1100.

```
Given hand blob list, called HND_BLOB_LIST and a candidate
item blob list, called CANDI_ITEM_BLOB_LIST
    if (HND_BLOB_LIST is NULL)
        for each blob, called CBLOB, in CANDI_ITEM_BLOB_LIST
            insert CBLOB into the final item blob list, called
            ITEM_BLOB_LIST
        end for
        return ITEM_BLOB_LIST
    end if
    remove all hand blobs in HND_BLOB_LIST from
        CANDI_ITEM_BLOB_LIST
    BOUNDRY_TOUCH_POINT =
        detectBoundryTouchPoint(CANDI_ITEM_BLOB_LIST)
    ARM_BLOB_LIST = armBlobDetect(CANDI_ITEM_BLOB_LIST,
        HND_BLOB_LIST, BOUNDRY_TOUCH_POINT)
    remove all arm blobs in ARM_BLOB_LIST from
        CANDI_ITEM_BLOB_LIST
    for each blob, called CBLOB, in CANDI_ITEM_BLOB_LIST
        if (spuriousProduct(CBLOB) is not true)
            insert CBLOB into final item blob list, called
            ITEM_BLOB_LIST
        end if
    end for
    return ITEM_BLOB_LIST
```

Function detectBoundryTouchPoint returns the position (i.e. x,y values in image coordinates) at which any blob in CANDI_ITEM_BLOB_LIST touches the image boundary (left, bottom, right, but not the top of the image since a customer cannot scan from the top of the scanner bed). If more than one blob within CANDI_ITEM_BLOB_LIST touches the boundary a single touch point is selected. The order of touch selection is bottom, left, and then right-side. This selection is made based on a prior knowledge about user behavior and the physical configuration of the self-checkout terminal. It is assumed that this boundary touch point is the intersection of the user's arm with the base of the image.

Figure 6:
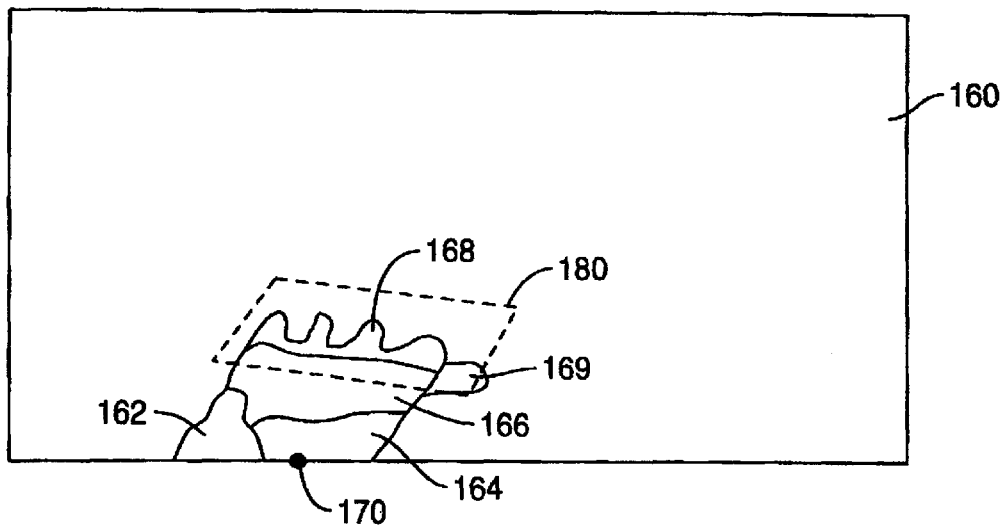
FIGS. 6 and 7 are diagrams illustrating how an item blob is located from image information for a hand blob, according to the present invention.

Referring to FIG. 6, the operation of Function armBlob-Detect is described. In these diagrams, reference numeral 160 represents an entire video frame. Reference numerals 162, 164, 166 and 168 are image regions or blobs of particular interest, Specifically, reference numeral 168 represents a hand blob. Blobs 162, 164 and 166 are blobs between the hand blob 168 and a boundary touch point 170. Blob 169 is another blob in the image. Reference numeral 180 is the hand bounding box.

Function armBlobDetect returns the fist of blobs that compose the arm of a user. Given a boundary touch point 170 for the arm and a hand blob list, the set of blobs between the touch point and the hand blob(s) are almost always part of the arm. First, the routine determines which blob contains the touch point and initializes the arm cluster with this blob. In FIG. 6, blob 164 contains the touch point 170. Next the routine . performs a region growing function by applying the constraint:

If a blob intersects with the arm cluster and greater than 50 percent of the blobs pixels are not in the hand bounding box 180, the blob is added to the arm cluster list.

In FIG. 6, blobs 162 and 166 will be added to the arm list. Blob 169 is not added to the arm cluster list because it does not intersect with blobs 162, 164 or 166. Thus, in the example shown in FIG. 6, the arm cluster list consists of blobs 162, 164 and 166.

Figure 7:
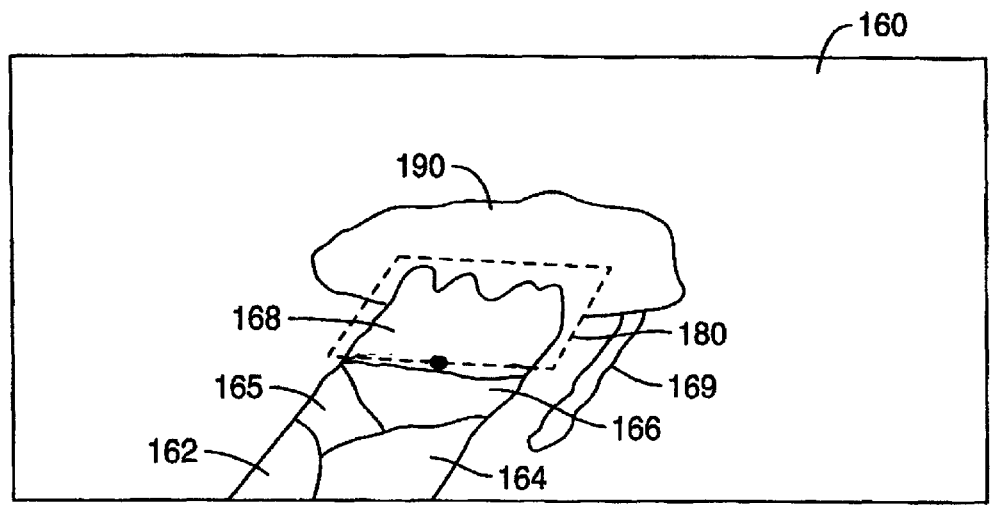

Referring to FIG. 7, function spuriousProduct will be described. In FIG. 7, blob 190 corresponds to a product or item. Function spuriousProduct determines if a blob has been incorrectly classified as a product. This typically occurs when noise blobs are created by the segmentation module, due to shadows or noise. These blobs do no belong to the arm hand, or product. This function returns TRUE if the blob was spuriously classified as product. In many cases, very slender blobs along the arm boundary do not meet the arm constraints, resulting in blobs being incorrectly classified as belonging to a product. FIG. 7 shows an example of a blob 169 that was not classified as part of the arm, since the blob does not intersect with any of the arm blobs 162, 164, 165 or 166. Based on a priori knowledge about customer position with respect to the scanner bed, these blobs can be filtered from the set of product blobs based on their y-position. If the center of mass for the blob is at a location in the image lower than the y-coordinate at the midpoint 182 of the base of the hand bounding box 180, the blob is regarded as a spurious product blob.

Track Analyzer 1300

The track analyzer module 1300 analyzes object paths based on tracks in the TCG to provide a real world interpretation of the activities occurring in the scene. This real world information includes the space and time location of hands and/or items in the scene, including whether or not an item's path crosses over the scanner. The track analyzer module 1300 may generate the following security events based on the current set of object paths in the system.

1. Empty hand passed over scanner, including direction (i.e. left-to-right);
2. Product passed over scanner (1400), including direction;
3. Empty hand passed over scanned product zone (1406), including direction (i.e, left-to-right);
4. Product passed over scanned product zone (zone 1406), including direction;
5. Product placed in scanned product zone (zone 1406); and
6. Product, passed over scanner (zone 1400) and then placed in scanned product zone (zone 1406).

To determine an object path, the track analyzer module 1300 queries the TCG to obtain the current set of hand tracks. A hand track consist of the following information.

1. The region cluster representing the hand at any point in time.
2. Features about the hand region cluster at any point in time, specifically feature information.
3. A reference to a region cluster representing the item held in the hand at any point in time.
4. Features about the item region cluster.

The hand track can be evaluated to determine if the hand crossed over the scanner or into the product scanned zone by comparing track information to a real world model of the check stand. The real world model is an image that contains eight bits per pixel location. Each pixel contains the following value 0: indicates an undefined area
1: indicates the scanner area
2: indicates the scanned product area The presence of a product versus an empty hand is determined by analyzing the product object associated with each hand in the track. Due to noise and other errors mi the imaging system, the product size will be evaluated to determine if a product is present. For each track, the track analyzer 1300 generates and maintains the following statistics.

1. Average product size, total pixels, over the current track sample.
2. Average product size over a three frame sample. At time i, this is calculated as (size(i−1)+size(i)+size(i+1))/3. At he end points, only two time sample are used for the calculation.

When analyzing the set of points in a track, the system determines if a product is present by the average product size. If the average size is greater than the minimum product threshold, a product is present. The system can also determine that a product has been released when the product size becomes less than the minimum product threshold.

Events of interest are generated by the following process.
1. Get the initial point in the object track.
2. Query the real world image model to obtain the object location.

Add the location to the Location List. Set the variable lastLocation equal to this location. Add the product status to the Status List. Set the variable productStatus equal to the product status. Set the lastLocation to the x,y location of the object and add UNDEFINED to the Direction List. Set CurrentDirection equal to UNDEFINED.

3. Calculate the direction of movement based on the lastLocation and current object location. A larger x coordinate is left-to-right and a smaller value is right-to-left. If the change is small, the current direction remains unchanged. If the direction is large, update currentDirection and lastLocation.
4. For each set of consecutive points in the object track i and i+1, generate a be between the two points. At each point in the line, compare the real world object location to lastLocation. If lastLocation is not equal to the current location, add the new location to the Location list and set lastLocation equal to the new location. Add the product size to the, Size List. Add currentDirection to the Direction list.
5. For each set of consecutive points in the object track, i and i+1, generate the average product size. If the product status, present or not present changes state, add the location to the Location List. Add the size to the Size List. Add currentDirection to the Direction list.

Events are generated by analyzing the Location List and Size List. The table of sequences below indicate the following events.

| Sequence | Path |
| --- | --- |
| *<1,D,P>* | Product Passed Over Scanner |
| *<1,D,N>* | Empty Hand Passed Over Scanner |
| *<2,D,P>* | Product Passed Over Scanned Product Area |
| *<2,D,N>* | Empty Hand Passed Over Scanned Product Area |
| <*,D,P><2,D,N> | Product Placed In Scanned Product Area |
| <*,D,P><2,DN> | Product Removed From Scanned Product Area |
| <1,D,P><2,D,P><2,D,N> | Product Passed Over Scanner and Placed in Scanned Product Area |

The triple <real world location, direction, product presence> is defined, where real world location is defined in the real world image, direction is either left-to-right or right-to-left, denoted by D, and product presence is N for no product, P for product.

Additional sequences and/or real world locations can be defined to generate other events.

Output

In one embodiment, the output of the system of the present invention may be an event stream that describes the interaction of people with a self-service checkout workstation. The present invention may be implemented to measure the following information:

empty hand passed over scanner, including direction (i.e. left-to-right);

product passed over scanner, including direction;

empty hand passed over bagging area including direction (i.e. left-to-right);

product passed over bagging area, including direction;

product placed in bagging area;

product passed over scanner and then placed in bagging area;

product on scale with no customer activity;

product not on scale.

This information may be stored in a binary Me called an event file, on hard disk or other storage media (e.g., reference numeral 150 in FIG. 1). Event files are files created on each processing system 130 that is performing analysis. Each activity described above may be logged as an event.

When the processing system 130 detects an activity at the self checkout station, a new event is generated. The following table describes an example data format of an event in one embodiment:

| Field | Function |
| --- | --- |
| event identifier | identifies the event type |
| Timestamp | indicates the time of event creation |

Also, rather than store data in an event file on storage device 150, the event stream may be input directly into a separate process, such as a security system and process for a self-service checkout workstation as described in the aforementioned application entitled "Method and Apparatus for Enhancing Security in a Self-Service Checkout Terminal". For example, in a Windows® NT implementation, the events can be sent to an application's messaging queue, allowing the system to process the events in real-time.

Configuration Tool

In order to configure the system for the particular scene, a configuration tool is required as described below. In the preferred embodiment, the configuration tool may be a Visual Basic application operating on the processing system 130, that supports a graphical user interface.

The process for configuring the scanner zone 1402 and scanned product zone 1406 is a follows. From the configuration tool, the user captures an image from the frame grabber card 120 that is stored in memory 135. The camera image may then be displayed on the PC display (not specifically shown, but inherent in PC 130). The scanner zone 1402 and scanned product zone 1406 may be created by using a mouse input device, or any other suitable input device of PC 130. For example, to create a scanner zone (e.g., scanner bounding box parameters, etc.) for analysis, the user may select a "create a scanner zone" option from a menu. All parameters associated with the scanner zone are now entered on a keyboard or other input device associated with the PC 130. An analogous process is followed when creating a scanned product zone 1406.

After all zones are created and configured, the parameters may then be saved to a storage device 150 (e.g., hard disk drive, etc.) as a parameter file that is loaded by the present invention at initialization time.

The video image processing system according to the present invention is useful in any environment where it is desired to determine whether an item is properly passed through an area of interest. Self-service checkout and point-of-sale terminals are only examples.

In summary, the present invention is directed to a system for detecting hand, movement patterns with respect to a checkout terminal, comprising:

(a) a video camera positioned to view a scene which includes therein a scanner for scanning items;

(b) frame grabber means coupled to the video camera for generating a stream of video frames representing activity in the scene;

(c) processor means coupled to the frame grabber means, the processor means performing steps of:

(1) detecting one or more hands in a video frame;

(2) trailing hand movement with respect to the scanner over a plurality of video frames and generating tracking information representative thereof; and (3) generating event information descriptive of user activity at the checkout terminal based on the tracing information.

The processor means may store the tracking information and/or event information in the storage means.

Similarly, the present invention is directed to a method for detecting hand movement patterns with respect to a scene of activity at a checkout terminal having a scanner, based on a sequence of video frames representing activity in the scene, comprising steps of:

(a) detecting one or more hands in a video frame;

(b) tracking hand movement with respect to the scanner over a plurality of video frames and generating tracking information representative thereof; and (c) generating event information descriptive of user activity at the checkout terminal based on the tracking information.

While the invention has been illustrated and described in detail, in the drawings and foregoing description, such an illustration and description is to be considered as exemplary and not restrictive in character, it being understood that only the preferred embodiment has been shown and described and that all changes and modifications that come within the, spirit of the invention are desired to be protected.

What is claimed is:

1. A system for detecting movement patterns with respect to at least one hand of an individual and an item in the individual's hand to be purchased at a checkout terminal, comprising:

(a) a video camera positioned to view a scene which includes therein a scanner for scanning items;

(b) frame grabber means coupled to the video camera for generating a stream of video frames representing activity in the scene;

(c) processor means coupled to the frame grabber means, the processor means performing steps of:

(1) detecting whether the hand in a video frame;

(2) tracking hand movement with respect to the scanner over a plurality of video frames and generating tracking information representative thereof including associated X and Y Cartesian coordinates for the location of the hand and the height and width of the hand;

(3) eliminating tracking information corresponding to the detected hand;

(4) determining the presence of the item to be purchased in the detected hand; and (5) generating event information descriptive of user activity at the checkout terminal based on the tracking information.

2. The system of claim 1, and further comprising storage means, wherein the processor means stores the tracking information and/or event information in the storage means.

3. The system of claim 1, wherein the processor means detects one or more hands by:

(i) generating regions clusters for a video frame which are hypothesis of a hand; and (ii) evaluating each region cluster with hand model information and generating a confidence value that represents a likelihood that the region cluster represents a hand.

4. The system of claim 3, wherein the processor means generates the region clusters by periodically generating a background image representing background image information for the scene, comparing information for a video frame with the background image to generate regions, and forming region clusters by representing the regions into color regions, and combining one or more color regions based on predetermined criteria.

5. The system of claim 4, wherein the processor means discards those regions which are highly unlikely to contain a hand, prior to regimentation of the regions.

6. The system of claim 4, wherein the processor means forms a hypothesis list of regions clusters in order of highest likelihood of representing a hand.

7. The system of claim 6, wherein the processor means evaluates each region cluster in the hypothesis list by comparing it with hand model information and generating a confidence value representing a degree of match with the hand model information, and wherein a region cluster determined to have confidence value which exceeds a minimum confidence threshold is added to a hand list.

8. The system of claim 7, wherein the processor means is programmed to determine whether an item is associated with a region cluster in the hand list.

9. The system of claim 8, wherein the processor means tracks hand movement by:

(i) determining a measure of correspondence between region clusters in consecutive video frames that are determined to represent a hand;

(ii) constructing hand tracks based on the measure of correspondence of region dusters determined between video frames.

10. The system of claim 1, wherein the processor generates event information for at least one of the following events: (a) an item has passed over the scanner, including its direction; (b) an empty hand has passed over the scanner, (c) an item passed over a scanned product zone in the self-service checkout terminal; (d) an empty hand passed over scanned product zone; (e) an item was placed in the scanned product zone; (f) an item was removed from the scanned product zone; and (g) an item was passed over the scanner and placed in the scanned product zone.

11. A method for detecting movement patterns with respect to at least one hand of an individual and an item in the individual's hand to be purchased in a scene of activity at a checkout terminal having a scanner, based on a sequence of video frames representing activity in the scene, comprising steps of:

(a) detecting whether the hand in a video frame;

(b) tracking hand movement with respect to the scanner over a plurality of video frames and generating tracking information representative thereof including associated X and Y Cartesian coordinates for the location of the hand and the height and width of the hand;

(c) eliminating tracking information corresponding to the detected hand;

(d) determining the presence of the item to be purchased in the detected hand; and (e) generating event information descriptive of user activity at the checkout terminal based on the tracking information.

12. The method of claim 11, and further comprising-the step of storing the tracking information and/or event information.

13. The method of claim 11, wherein the step of detecting one or more hands in a video frame comprises steps of:

(i) generating regions dusters for a video frame which are hypothesis of a hand; and (ii) evaluating each region cluster with hand model information and generating a confidence value that represents a likelihood that the region cluster represents a hand.

14. The method of claim 13, wherein the step of generating the region clusters comprises steps of periodically generating a background image representing background image information for the scene, comparing image information for a video frame with the background image to generate regions, and forming region clusters by resegmenting the regions into color regions, and combining one or more color regions based on predetermined criteria.

15. The method of claim 14, and further comprising the step of discarding those regions which are highly unlikely to contain a hand, prior to resegmentation of the regions.

16. The method of claim 14, and further comprising the step of forming a hypothesis list of regions clusters in order of highest likelihood of representing a hand.

17. The method of claim 16, wherein the step of evaluating comprises evaluating each region cluster in the hypothesis list by comparing it with hand model information and generating a confidence value representing a degree of match with the hand model information, and wherein a region duster determined to have confidence value which exceeds a confidence threshold is added to a hand list.

18. The method of claim 17, and further comprising the step of determining whether an item is associated with a region cluster in the hand list.

19. The method of claim 18, wherein the step of tracking hand movement comprises steps of:

(i) determining a measure of correspondence between region clusters in consecutive video frames that are determined to represent a hand;

(ii) constructing hand tracks based on the measure of correspondence of region clusters determined between video frames.

20. The method of claim 11, wherein step of generating event information comprises generating information for at least one of the following events: (a) an item has passed over the scanner, including its direction, (b) an empty hand has passed over the scanner; (c) an item passed over a scanned product zone in the self-service checkout terminal; (d) an empty hand passed over scanned product zone; (e) an item was placed in the scanned product zone; (f) an item was removed from the scanned product zone, and (g) an item was passed over the scanner and placed in the scanned product zone.

21. The method of claim 11, wherein the step of determining the presence of the item to be purchased in the detected hand comprises steps of:

(a) calculating an average product size for the item over time;

(b) comparing the calculated average product size with a minimum product size threshold; and (c) determining from the comparison whether the item to be purchased in the detected hand.

* * * * *

UNITED STATES PATENT AND TRADEMARK OFFICE
CERTIFICATE OF CORRECTION

PATENT NO.    : 6,236,736 B1                                     Page 1 of 1
DATED         : May 22, 2001
INVENTOR(S)   : Ralph N. Crabtree et al.

It is certified that error appears in the above-identified patent and that said Letters Patent is hereby corrected as shown below:

Column 18,
Line 25, after "comparing" insert -- image --.
Line 27, delete "representing" and substitute -- resegmenting --.
Line 32, delete "regimentation" and substitute -- resegmentation --
Line 52, delete "dusters" and substitute -- clusters --.

Column 19,
Line 19, delete "dusters" and substitute -- clusters --.

Column 20,
Line 4, delete "duster" and substitute -- cluster --.
Line 5, after "exceeds a" insert -- minimum --.

Signed and Sealed this

Second Day of July, 2002

Attest:

Attesting Officer

JAMES E. ROGAN
Director of the United States Patent and Trademark Office